Figure 1:
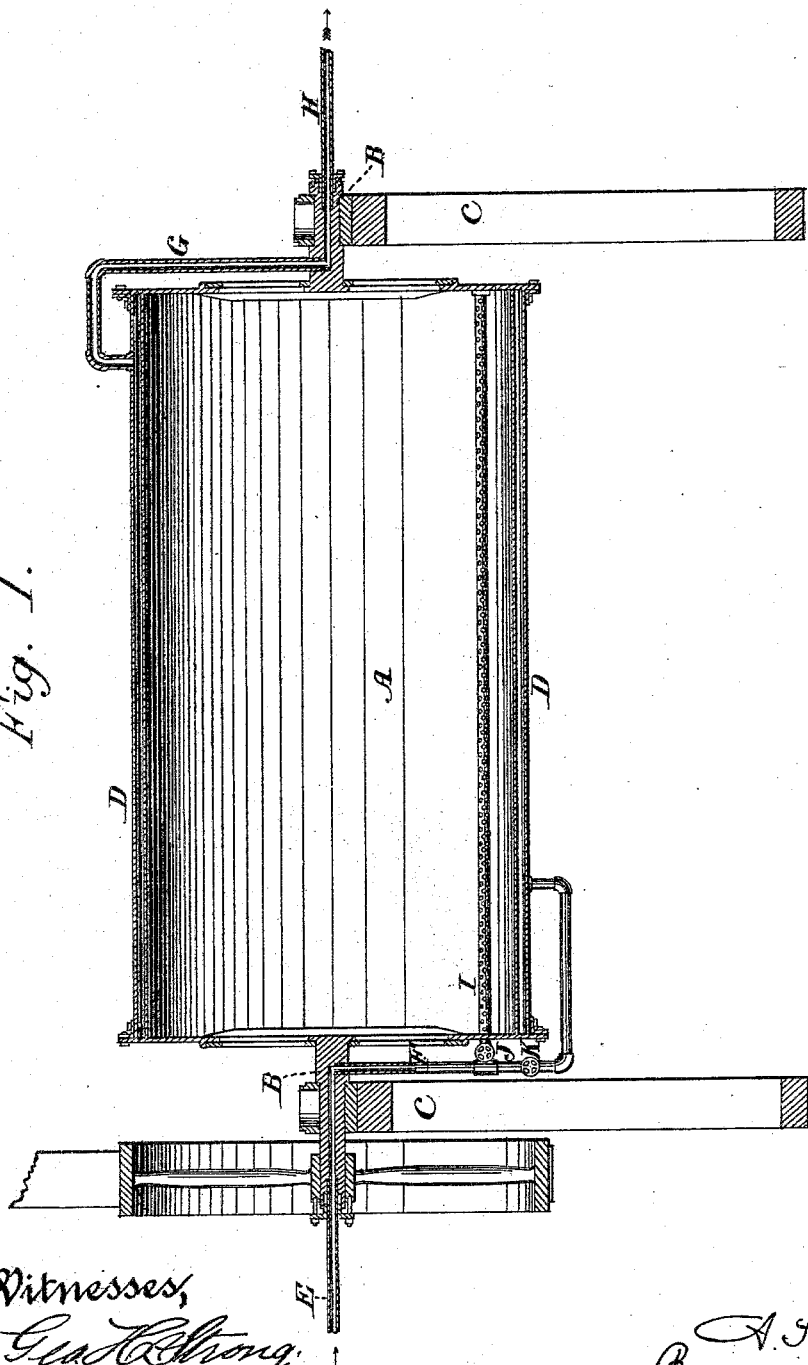

(No Model.)

2 Sheets—Sheet 1.

A. SCHILLING.
APPARATUS FOR CURING TEA AND COATING COFFEE.

No. 295,290.

Patented Mar. 18, 1884.

Witnesses,
Geo. H. Strong.
J. H. Rouse

Inventor,
A. Schilling
By Dewey & Co.,
Attorneys (No Model.) 2 Sheets—Sheet 2.
A. SCHILLING.
APPARATUS FOR CURING TEA AND COATING COFFEE.
No. 295,290. Patented Mar. 18, 1884.
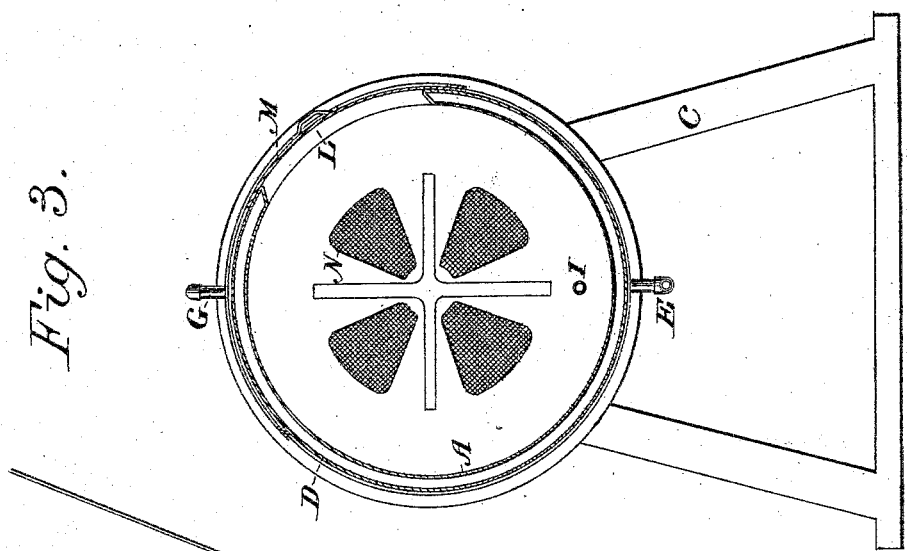
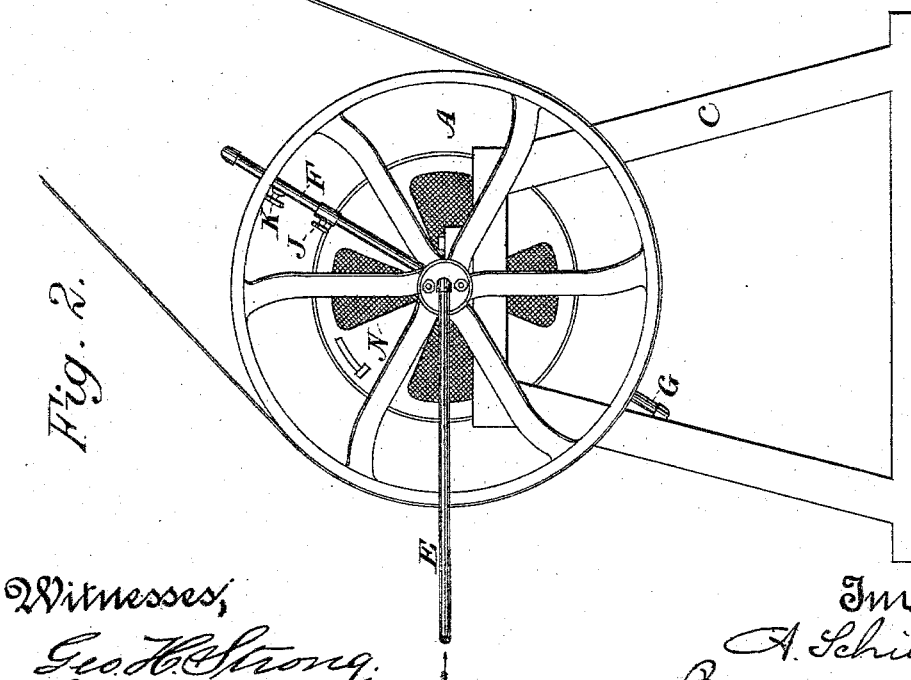

UNITED STATES PATENT OFFICE.

AUGUST SCHILLING, OF SAN FRANCISCO, CALIFORNIA.

APPARATUS FOR CURING TEA AND COATING COFFEE.

SPECIFICATION forming part of Letters Patent No. 295,290, dated March 18, 1884.

Application filed September 25, 1883. (No model.)

*To all whom it may concern:*

Be it known that I, AUGUST SCHILLING, of the city and county of San Francisco, and State of California, have invented an Improvement in Apparatus for Curing Tea and Coating Coffee; and I hereby declare the following to be a full, clear, and exact description thereof.

My invention relates to an apparatus for curing tea, glazing coffee, and performing other functions of a similar nature; and it consists of a revolving cylinder, into which the substance to be treated is introduced, said cylinder being surrounded by a steam-jacket or other device suitable for imparting the heat of steam to it, as will be more fully explained by reference to the accompanying drawings, in which—

Figure 1 is a longitudinal vertical section of the apparatus. Fig. 2 is an end view with driving-belt pulley. Fig. 3 is a transverse section.

A is a cylinder, having journals or trunnions B, which turn in boxes upon the standards or supports C. Around the outside of this cylinder is a jacket, which may consist of a coil of pipes; or, as in the present case, it may be formed by an exterior shell, D, bolted to the heads of the inner cylinder, as shown. The shafts or trunnions are bored in longitudinally from the ends, and one of them has a steam-pipe, E, connected with it, with a stuffing-box to prevent leakage. From a point between the journal and the cylinder-head a pipe, F, extends outward radially from the shaft, opening into its interior, and being bent at the outer end, so as to enter the outer jacket through its shell D, thus admitting steam to the interior, which will circulate around the inner cylinder. From a point near the opposite end another similar pipe, G, leads out from the jacket and connects with the opposite trunnions, through which and a pipe, H, the steam is discharged. From the pipe F a pipe, I, extends horizontally through the inner cylinder near its periphery, and is perforated with small holes throughout its length within the cylinder. A hand wheel-valve or stop-cock at J controls the admission of steam to the pipe I, and a valve at K controls the admission of steam through the pipe F into the exterior jacket. A man-hole or opening, L, is made through the cylinder and its jacket, the flange or rim being made tight to prevent the escape of steam at that point. A door, M, is fitted to this opening, with suitable packing at the edges and fastenings to close it tight, and this serves for the admission and removal of the substance to be dried or otherwise treated.

The operation will then be as follows: The substance to be treated is introduced through the opening L, the door is closed, and the cylinder being set in rotation by means of a belt or other mechanism, steam is admitted through the pipe E, the stuffing-box allowing the shaft to turn without leakage at that point.

The valve J may be opened and steam admitted to the interior of the cylinder through the jet-openings in the pipe I, if it is desired to first moisten the contents of the cylinder, and when this has proceeded far enough the valve J may be closed, and the valve K opened to admit steam into the outer jacket.

One or both of the heads of the cylinder may have an opening or openings, N, through which the vapors may escape from the interior. These openings are protected with wire-cloth, and have covers which may be opened or closed at pleasure.

Having thus described my invention, what I claim as new, and desire to secure by Letters Patent, is—

In an apparatus for curing tea and coating coffee, the rotating cylinder having a door-opening and a surrounding jacket, into which steam may be admitted through pipes connecting with one trunnion and be discharged through the other, in combination with a jet-tube or pipe extending horizontally through the interior cylinder near its periphery, and cocks or valves through which steam may be admitted to either the jacket or cylinder, substantially as herein described.

In witness whereof I have hereunto set my hand.

AUGUST SCHILLING.

Witnesses:
CHAS. E. KELLY,
CLAUS SCHILLING.